US008272467B1

(12) United States Patent
Staab

(10) Patent No.: US 8,272,467 B1
(45) Date of Patent: Sep. 25, 2012

(54) REMOTELY CONTROLLED BACKHOE

(76) Inventor: Michael A. Staab, Columbia, MO (US)

(*) Notice: Subject to any disclaimer, the term of this patent is extended or adjusted under 35 U.S.C. 154(b) by 0 days.

(21) Appl. No.: 13/040,483

(22) Filed: Mar. 4, 2011

(51) Int. Cl.
*B60T 7/16* (2006.01)

(52) U.S. Cl. ............................... 180/167; 701/50; 172/2

(58) Field of Classification Search .................. 180/167, 180/65.1, 89.1, 271; 701/1, 2, 50; 172/2; 37/348, 435, 443, 379; 212/169
See application file for complete search history.

(56) References Cited

U.S. PATENT DOCUMENTS 3,596,565 A 7/1969 Atkinson
4,052,712 A * 10/1977 Ohama et al. ................ 352/121
4,446,636 A 5/1984 Weinert
4,526,413 A * 7/1985 Williams ...................... 294/198
D309,313 S 7/1990 Takashima et al.
5,551,524 A * 9/1996 Yamamoto et al. .......... 180/6.62
5,936,185 A * 8/1999 Tokuni .......................... 89/1.13
6,282,477 B1 * 8/2001 Gudat et al. .................... 701/50
6,435,071 B1 * 8/2002 Campbell ....................... 180/41
6,523,765 B1 * 2/2003 Hashimoto et al. ............. 241/30
6,736,216 B2 * 5/2004 Savard et al. ..................... 172/1
6,782,644 B2 8/2004 Fujishima et al.
6,836,982 B1 * 1/2005 Augustine ........................ 37/348
6,923,285 B1 * 8/2005 Rossow et al. ................ 180/272
7,032,703 B2 * 4/2006 Wulfert et al. ................ 180/329
7,400,959 B2 * 7/2008 Price et al. ....................... 701/50
7,516,563 B2 * 4/2009 Koch .............................. 37/348
7,565,941 B2 * 7/2009 Cunningham ................ 180/167
7,578,079 B2 * 8/2009 Furem ............................ 37/348
7,734,398 B2 * 6/2010 Manneppalli ................... 701/50
7,835,854 B2 * 11/2010 Yamamoto et al. ........... 701/117
7,890,235 B2 * 2/2011 Self et al. ........................ 701/50
7,934,329 B2 * 5/2011 Mintah et al. .................. 37/348
7,975,410 B2 * 7/2011 Faivre et al. .................... 37/348
8,180,532 B2 * 5/2012 O'Halloran et al. ............ 701/49
8,195,344 B2 * 6/2012 Song et al. ........................ 701/2
2003/0036817 A1 * 2/2003 Morley et al. ................. 700/245
2006/0224280 A1 * 10/2006 Flanigan et al. .................. 701/2
2006/0271263 A1 * 11/2006 Self et al. ........................ 701/50
2007/0094946 A1 5/2007 Schoeny et al.
2009/0112389 A1 * 4/2009 Yamamoto et al. ............. 701/29
2009/0259373 A1 * 10/2009 Nichols et al. .................. 701/50
2011/0137491 A1 * 6/2011 Self et al. .......................... 701/2
2011/0282519 A1 * 11/2011 Carlsson ........................... 701/2
2012/0105638 A1 * 5/2012 Englander ..................... 348/148
2012/0136525 A1 * 5/2012 Everett et al. .................. 701/24

* cited by examiner

*Primary Examiner* — John Walters
*Assistant Examiner* — James Triggs

(57) ABSTRACT

A remotely controlled backhoe is provided to permit operation of a backhoe and visual monitoring of a volatile or dangerous excavation site from a safe distance. The backhoe has an articulated rear boom arm and a rear bucket. Cameras are coupled to the backhoe proximate a left rear corner and a right rear corner of the cabin roof. A rear boom arm control is positioned on a remote control unit. The rear boom arm control is operationally coupled to the rear boom arm for maneuvering the rear boom arm. A rear bucket control is also positioned on the remote control unit and operationally coupled to the rear bucket for maneuvering the rear bucket. A monitor is coupled to the remote control unit and operationally coupled to the left rear camera and the right rear camera for displaying images from the left rear camera and the right rear camera.

19 Claims, 5 Drawing Sheets

REMOTELY CONTROLLED BACKHOE

BACKGROUND OF THE DISCLOSURE

Field of the Disclosure

The disclosure relates to excavation devices and more particularly pertains to a new excavation device for operation of a backhoe and visual monitoring of a volatile or dangerous excavation site from a safe distance.

SUMMARY OF THE DISCLOSURE

An embodiment of the disclosure meets the needs presented above by generally comprising a backhoe having an articulated rear boom arm, a rear bucket coupled to the rear boom arm, and a cabin having a roof. A left rear camera is coupled to the backhoe proximate a left rear corner of the roof and a right rear camera coupled to the backhoe proximate a right rear corner of the roof. A rear boom arm control is positioned on a remote control unit. The rear boom arm control is operationally coupled to the rear boom arm for maneuvering the rear boom arm. A rear bucket control is also positioned on the remote control unit and operationally coupled to the rear bucket for maneuvering the rear bucket. A monitor is coupled to the remote control unit and operationally coupled to the left rear camera and the right rear camera for displaying images from the left rear camera and the right rear camera.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
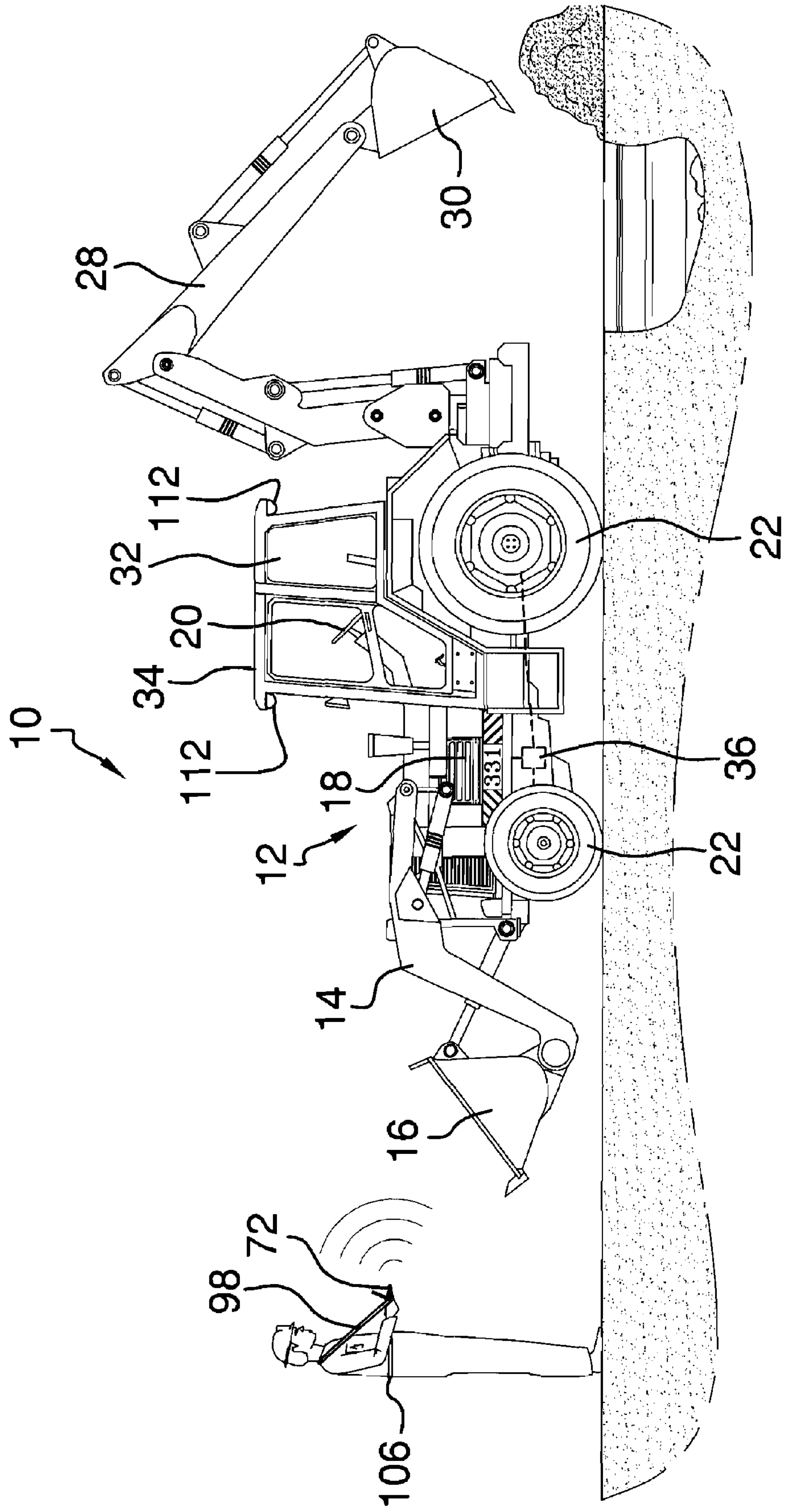
FIG. 1 is a side view of a remotely controlled backhoe according to an embodiment of the disclosure in use.
Figure 2:
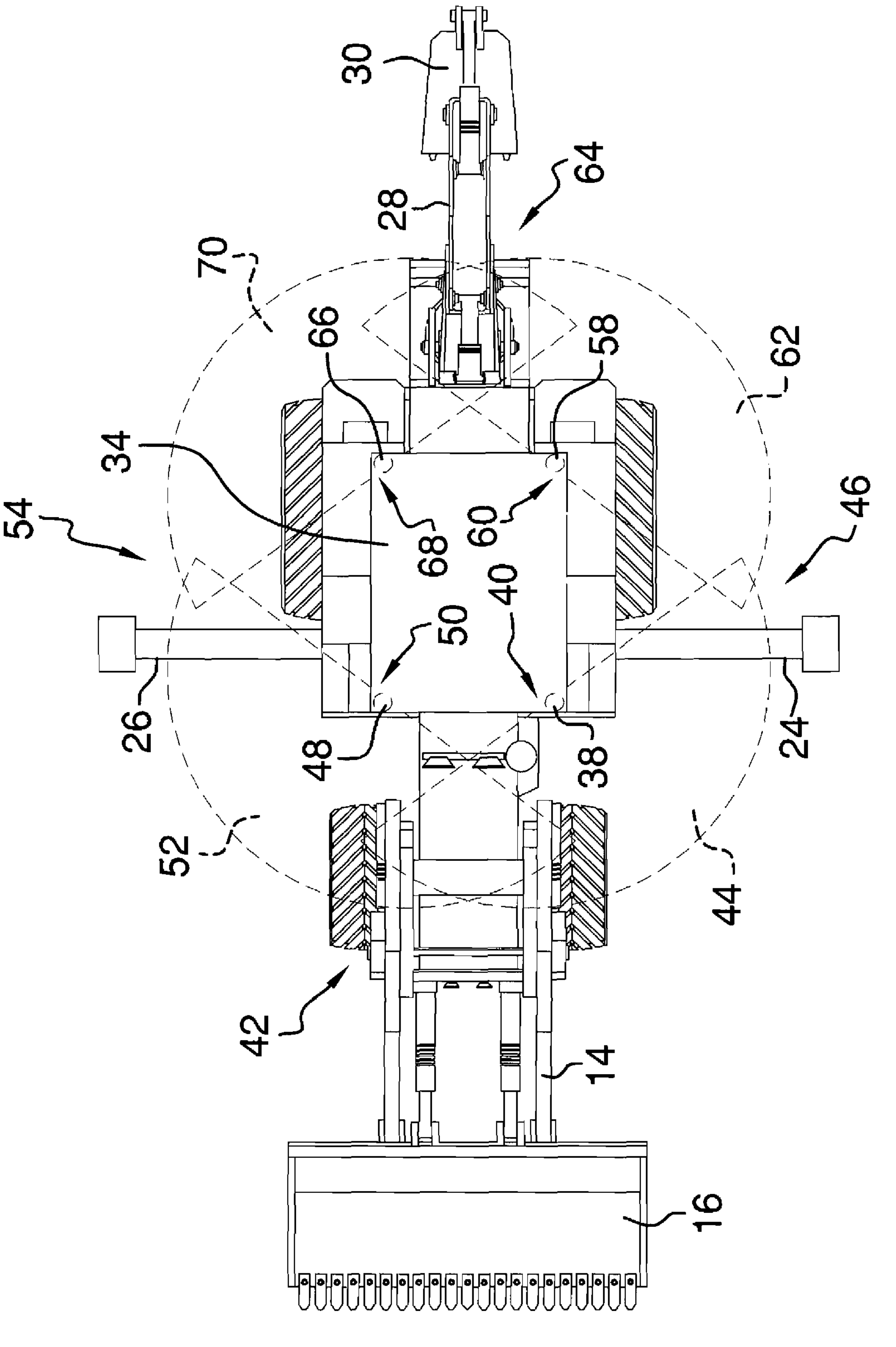
FIG. 2 is a top view of an embodiment of the disclosure.
Figure 3:
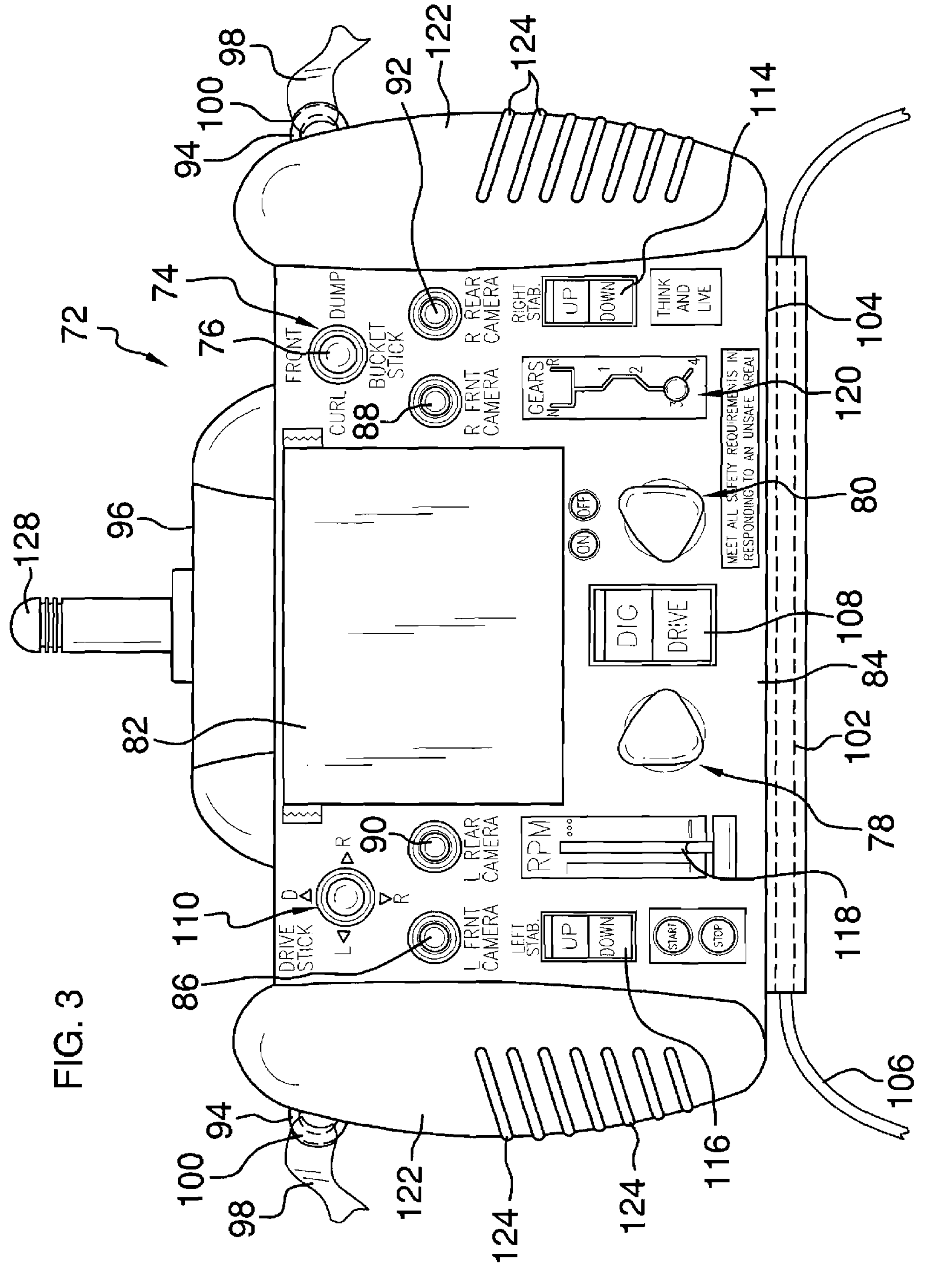
FIG. 3 is a top view of an embodiment of the disclosure.
Figure 4:
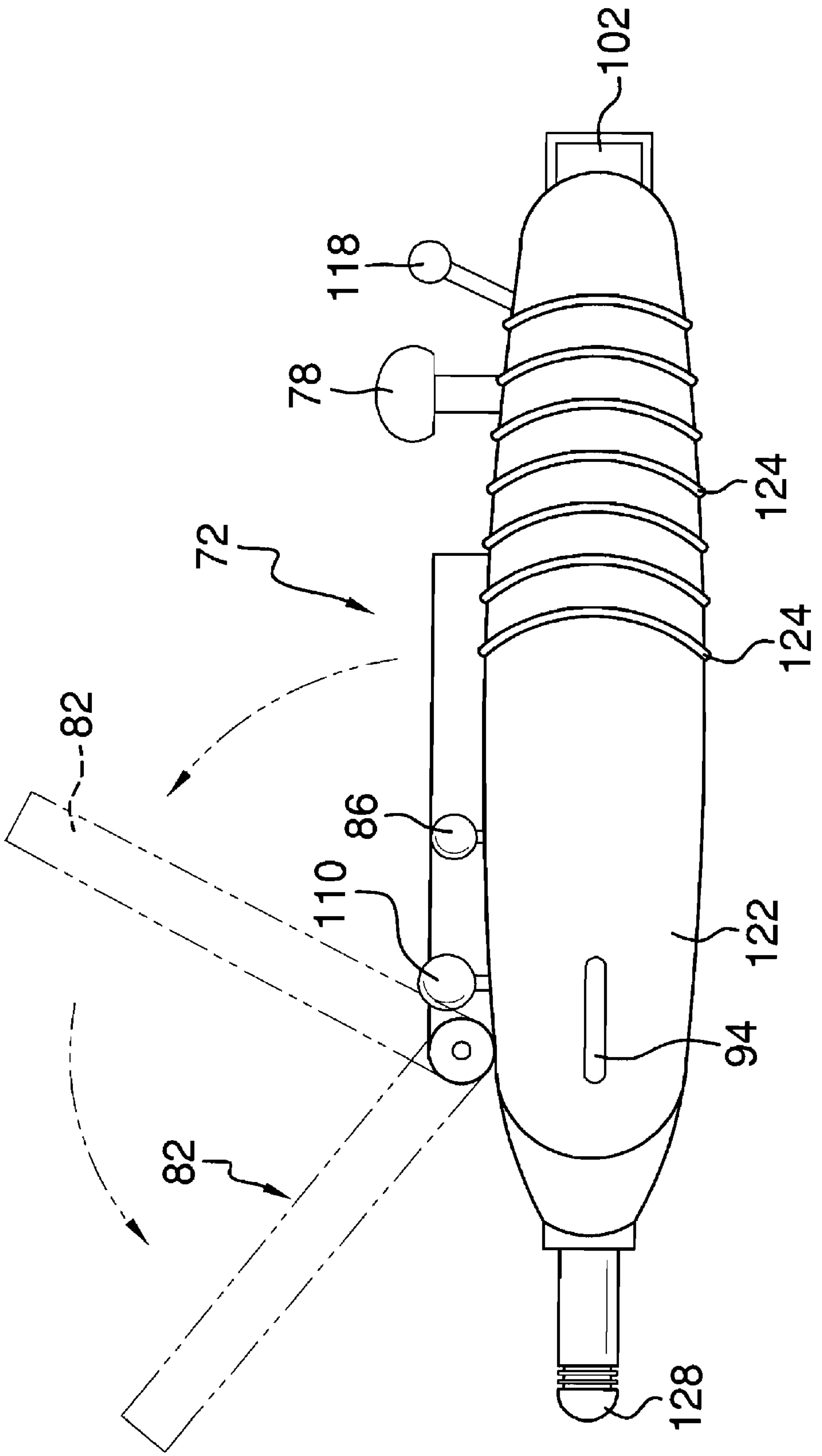
FIG. 4 is a side view of an embodiment of the disclosure.
Figure 5:
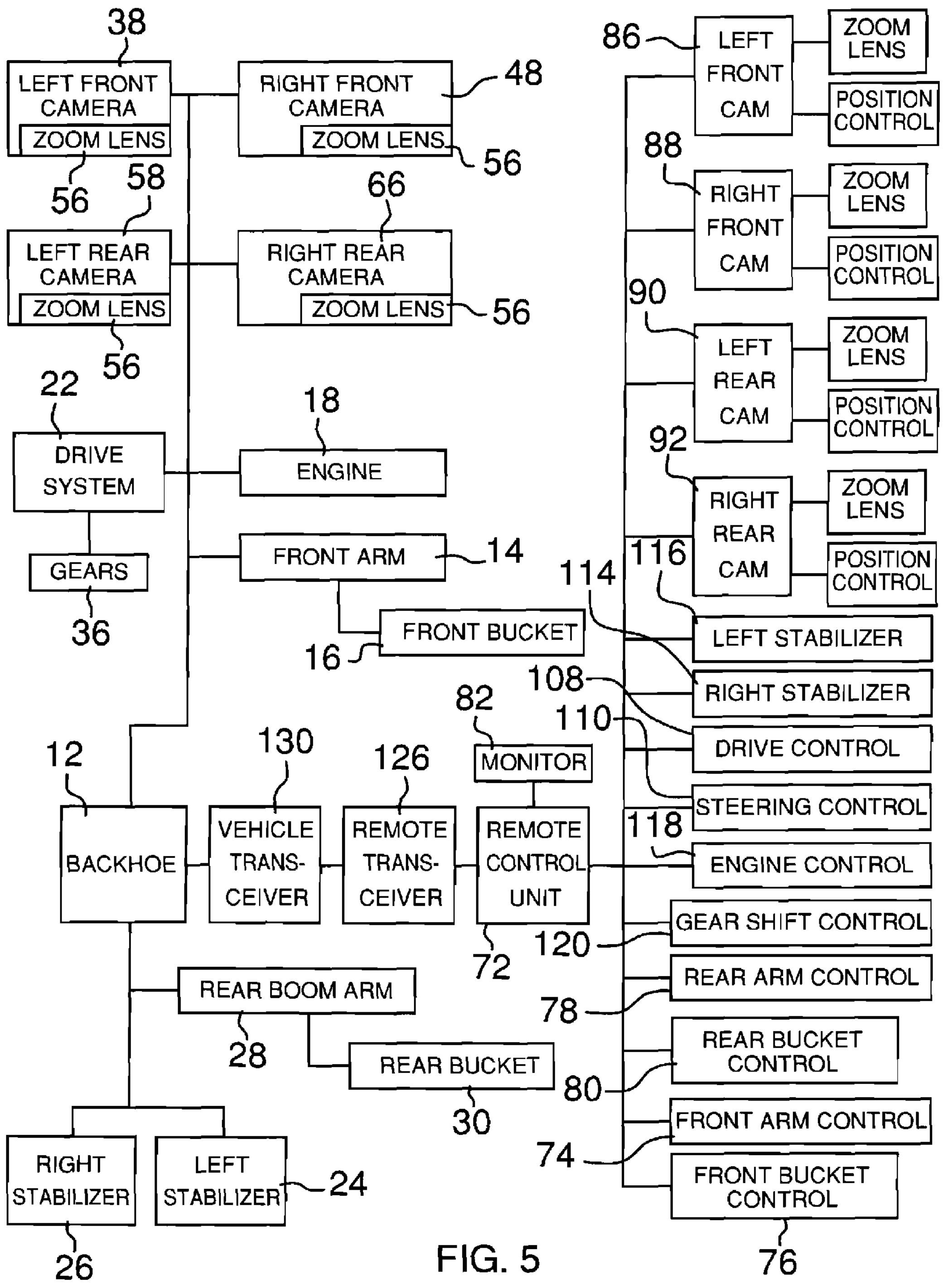
FIG. 5 is a schematic diagram of an embodiment of the disclosure.

With reference now to the drawings, and in particular to FIGS. 1 through 5 thereof, a new excavation device embodying the principles and concepts of an embodiment of the disclosure and generally designated by the reference numeral 10 will be described.

As best illustrated in FIGS. 1 through 5, the remotely controlled backhoe 10 generally comprises a backhoe 12 having an front arm 14, a front bucket 16 coupled to the front arm 14, an engine 18, a steering system 20, a drive system 22, a left stabilizer arm 24, a right stabilizer arm 26, a rear articulated boom arm 28, a rear bucket 30 coupled to the rear boom arm 28, and a cabin 32. The cabin 32 has a roof 34. The drive system 22 includes a plurality of gears 36.

A left front camera 38 coupled to the backhoe proximate a left front corner 40 of the roof 34. The left front camera 38 is pivotally adjustable relative to the backhoe 12 to monitor an area 44 adjacent to the backhoe 12 between a front 42 of the backhoe and a left side 46 of the backhoe 12. A right front camera 48 coupled to the backhoe 12 proximate a right front corner 50 of the roof. The right front camera 48 is pivotally adjustable relative to the backhoe 12 to monitor an area 52 adjacent to the backhoe 12 between the front 42 of the backhoe 12 and a right side 54 of the backhoe 12. The left front camera 38 and the right front camera 48 each include a zoom lens 56 adjustable to provide a close up view within the areas 44,52 adjacent to the backhoe 12. A left rear camera 58 is coupled to the backhoe 12 proximate a left rear corner 60 of the roof. The left rear camera 58 is pivotally adjustable relative to the backhoe 12 to monitor an area 62 adjacent to the backhoe 12 between a rear 64 of the backhoe and the left side 46 of the backhoe 12. A right rear camera 66 is coupled to the backhoe 12 proximate a right rear corner 68 of the roof 34. The right rear camera 66 is pivotally adjustable relative to the backhoe 12 to monitor an area 70 adjacent to the backhoe 12 between the rear 64 of the backhoe and the right side 54 of the backhoe 12. The left rear camera 58 and the right rear camera 66 each include a zoom lens 56 adjustable to provide a close up view within the areas 62,70 adjacent to the backhoe 12.

A remote control unit 72 is provided. A front arm control 74 is positioned on the remote control unit 72. The front arm control 74 is operationally coupled to the front arm 14 for maneuvering the front arm 14 up and down relative to the backhoe 12. A front bucket control 76 is positioned on the remote control unit 72. The front bucket control 76 is operationally coupled to the front bucket 16 for maneuvering the front bucket 16 to curl and dump. A rear boom arm control 78 is positioned on the remote control unit 72. The rear boom arm control 78 is operationally coupled to the rear boom arm 28 for maneuvering the rear boom arm 28. A rear bucket control 80 is positioned on the remote control unit 72. The rear bucket control 80 is operationally coupled to the rear bucket 30 for maneuvering the rear bucket 30. The rear boom arm control 78 and the rear bucket control 80 may be stick controls used in combination to dig using the rear bucket 30.

A monitor 82 is pivotally coupled to the remote control unit 72. The monitor 82 may be pivoted into various angles relative to a main body 84 of the remote control unit 72. A locking mechanism may be employed to hold the monitor 82 in a desired position to prevent shifting during use. The monitor 82 is operationally coupled to the left front camera 38 and the right front camera 48 for displaying images from the left front camera 38 and the right front camera 48. The left rear camera 58 is operationally coupled to the monitor 82 for displaying images from the left rear camera 58. Similarly, the right rear camera 66 is also operationally coupled to the monitor 82 for displaying images from the right rear camera 66. Area 44 and area 52 may overlap to the front 42 of the backhoe 12 and a program may be utilized to provide a composite image or three-dimensional image on the monitor 82. Area 62 and area 70 may overlap to the rear 64 of the backhoe 12 and the program may be utilized to provide a composite image or three-dimensional image on the monitor 82.

A left front camera control 86 is positioned on the remote control unit 72. The left front camera control 86 is operationally coupled to the left front camera 38 for operating and adjusting the left front camera 38 to display a desired portion of the area 44 at a desired magnification. The position of the left front camera 38 may be changed by moving a stick control and the zoom effect may be achieved by twisting of the stick control. A right front camera control 88 is positioned on the remote control unit 72. The right front camera control 88 is operationally coupled to the right front camera 48 for adjusting the right front camera 48. The right front camera 48 may be adjusted in similar fashion to the left front camera 38 as described above.

A left rear camera control 90 is positioned on the remote control unit 72. The left rear camera control 90 is operationally coupled to the left rear camera 58 for operating and adjusting the left rear camera 58. A right rear camera control 92 is positioned on the remote control unit 72. The right rear camera control 92 is operationally coupled to the right rear camera 66 for adjusting the right rear camera 66 also as described above.

A pair of neck slots 94 is provided in the remote control unit 72. The neck slots 94 are positioned proximate a top 96 of the remote control unit 72. A neck strap 98 has opposite ends 100. Each end 100 of the neck strap 98 is coupled to an associated one of the neck slots 94. Thus, the remote control unit 72 is configured to hang in an upright position from the neck strap 98 if so desired. A waist slot 102 is provided on or proximate a bottom 104 of the remote control unit 72. The waist slot 102 may extend along a substantial length of the bottom 104 as shown in FIG. 1. A waist strap 106 may be coupled to the waist slot 102 of the remote control unit 72 to assist in stabilizing the remote control unit 72 during use while minimizing interference with the free movement of the arms of the user.

A drive control 108 is positioned on the remote control unit 72. The drive control 108 is operationally coupled to the drive system 22 of the backhoe 12 for moving the backhoe 12 from a distance. A steering control 110 is positioned on the remote control unit 72 and operationally coupled to the steering system 20 of the backhoe 12 for steering movement of the backhoe 12.

A plurality of protective housings 112 is provided. Each protective housing 112 is coupled to an associated one of the left front camera 38, the right front camera 48, the left rear camera 58, and the right rear camera 66. Each housing 112 may be globe-shaped to minimize snagging on surrounding branches or other objects near the backhoe 12 during use, particularly when operated remotely.

A right stabilizer control 114 is positioned on the remote control unit 72 and operationally coupled to the right stabilizer arm 26 for adjusting the right stabilizer arm 26. Similarly, a left stabilizer control 116 is positioned on the remote control unit 72 and operationally coupled to the left stabilizer arm 24 for adjusting the left stabilizer arm 24 remotely. An engine control 118 is positioned on the remote control unit 72. The engine control 118 is operationally coupled to the engine 18 for adjusting rpms of the engine 18 during use of the backhoe 12. A separate gearshift control 120 may be positioned on the remote control unit 72 and operationally coupled to the gears 36 of the drive system 22.

The various controls on the remote control unit 72 may mirror the types of controls found in the particular brand of backhoe 12 utilizing stick type, shift type, or wheel type controls to facilitate use of the backhoe 12 by a user already experienced using the existing controls found in the particular backhoe 12 used. The remote control unit 72 may also incorporate bulbous end sections 122 with strips of frictional material 124 to enhance gripping of the remote control unit 72 during use. A remote transceiver 126 and antenna 128 are provided to facilitate wireless operational coupling with a vehicle transceiver 130 on the backhoe 12 to view camera images and operate the backhoe 12 using the remote control unit 72.

In use, the remote control unit 72 is manipulated to control all the necessary movements and systems of the backhoe 12. The backhoe 12 may be maneuvered remotely to a hazardous work site such as a gas line leak or any situation working near buried active gas or electric lines. The monitor 82 is viewed and the cameras 38,48,58, and 66 are adjusted remotely to provide sufficient view to permit safe operation of the rear boom arm 28 and rear bucket 30 to perform the desired task.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A remotely controlled backhoe assembly comprising:

a backhoe having an articulated rear boom arm, a rear bucket coupled to said rear boom arm, and a cabin having a roof, a front arm and a front bucket;

a left rear camera coupled to said backhoe proximate a left rear corner of said roof;

a right rear camera coupled to said backhoe proximate a right rear corner of said roof;

a remote control unit;

a rear boom arm control positioned on said remote control unit, said rear boom arm control being operationally coupled to said rear boom arm for maneuvering said rear boom arm;

a rear bucket control positioned on said remote control unit, said rear bucket control being operationally coupled to said rear bucket for maneuvering said rear bucket;

a front bucket control positioned on said remote control unit, said front bucket control being operationally coupled to said front bucket for maneuvering said front bucket to curl and dump; and a monitor coupled to said remote control unit, said monitor being operationally coupled to said left rear camera and said right rear camera for displaying images from said left rear camera and said right rear camera.

2. The assembly of claim 1, further comprising:

a left front camera coupled to said backhoe, said left front camera being operationally coupled to said monitor for displaying images from said left front camera; and a right front camera coupled to said backhoe, said right front camera being operationally coupled to said monitor for displaying images from said right front camera.

3. The assembly of claim 2, further comprising:

a left front camera control positioned on said remote control unit, said left front camera control being operationally coupled to said left front camera for operating and adjusting said left front camera; and a right front camera control positioned on said remote control unit, said right front camera control being operationally coupled to said right front camera for adjusting said right front camera.

4. The assembly of claim 1, further comprising:

a left rear camera control positioned on said remote control unit, said left rear camera control being operationally coupled to said left rear camera for operating and adjusting said left rear camera; and a right rear camera control positioned on said remote control unit, said right rear camera control being operationally coupled to said right rear camera for adjusting said right rear camera.

5. The assembly of claim 1, further comprising:

a pair of neck slots in said remote control unit, said neck slots being positioned proximate a top of said remote control unit; and a neck strap having opposite ends, each end of said neck strap being coupled to an associated one of said neck slots.

6. The assembly of claim 1, further comprising:

a waist slot in said remote control unit, said waist slot being positioned proximate a bottom of said remote control unit; and a waist strap coupled to said waist slot of said remote control unit.

7. The assembly of claim 1, further comprising:

said backhoe having a drive system; and a drive control positioned on said remote control unit, said drive control being operationally coupled to said drive system of said backhoe for moving said backhoe.

8. The assembly of claim 1, further comprising:

said backhoe having a steering system; and a steering control positioned on said remote control unit, said steering control being operationally coupled to said steering system of said backhoe for steering movement of said backhoe.

9. The assembly of claim 1, wherein said monitor is pivotally coupled to said remote control unit.

10. The assembly of claim 1, further including a plurality of protective housings, each protective housing being coupled to one of said left front camera and said right front camera.

11. The assembly of claim 4, further including a plurality of protective housings, each protective housing being coupled to an associated one of said left front camera, said right front camera, said left rear camera, and said right rear camera.

12. The assembly of claim 1, further comprising:

said left front camera being pivotally adjustable relative to said backhoe to monitor an area adjacent to said backhoe between a front of said backhoe and a left side of said backhoe; and said right front camera being pivotally adjustable relative to said backhoe to monitor an area adjacent to said backhoe between a front of said backhoe and a right side of said backhoe.

13. The assembly of claim 12, further including said left front camera and said right front camera each including a zoom lens adjustable to provide a close up view within said areas adjacent to said backhoe.

14. The assembly of claim 12, further comprising:

said left rear camera being pivotally adjustable relative to said backhoe to monitor an area adjacent to said backhoe between a rear of said backhoe and a left side of said backhoe; and said right rear camera being pivotally adjustable relative to said backhoe to monitor an area adjacent to said backhoe between a rear of said backhoe and a right side of said backhoe.

15. The assembly of claim 14, further including said left rear camera and said right rear camera each including a zoom lens adjustable to provide a close up view within said areas adjacent to said backhoe.

16. The assembly of claim 1, further comprising:

said backhoe having a left stabilizer arm and a right stabilizer arm;

a right stabilizer control positioned on said remote control unit, said right stabilizer control being operationally coupled to said right stabilizer arm for adjusting said right stabilizer arm; and a left stabilizer control positioned on said remote control unit, said left stabilizer control being operationally coupled to said left stabilizer arm for adjusting said left stabilizer arm.

17. The assembly of claim 1, further comprising:

said backhoe having an engine; and an engine control positioned on said remote control unit, said engine control being operationally coupled to said engine for adjusting rpms of said engine during use of said backhoe.

18. The assembly of claim 7, further comprising:

said drive system including a plurality of gears; and a gearshift control positioned on said remote control unit, said gearshift control being operationally coupled to said gears of said drive system.

19. A remotely controlled backhoe assembly comprising:

a backhoe having an front arm, a front bucket coupled to said front arm, an engine, a steering system, a drive system, left stabilizer arm, a right stabilizer arm, a rear articulated boom arm, a rear bucket coupled to said rear boom arm, and a cabin having a roof, said drive system including a plurality of gears;

a left front camera coupled to said backhoe proximate a left front corner of said roof, said left front camera being pivotally adjustable relative to said backhoe to monitor an area adjacent to said backhoe between a front of said backhoe and a left side of said backhoe;

a right front camera coupled to said backhoe proximate a right front corner of said roof, said right front camera being pivotally adjustable relative to said backhoe to monitor an area adjacent to said backhoe between a front of said backhoe and a right side of said backhoe, said left front camera and said right front camera each including a zoom lens adjustable to provide a close up view within said areas adjacent to said backhoe;

a left rear camera coupled to said backhoe proximate a left rear corner of said roof, said left rear camera being operationally coupled to said monitor for displaying images from said left rear camera, said left rear camera being pivotally adjustable relative to said backhoe to monitor an area adjacent to said backhoe between a rear of said backhoe and a left side of said backhoe;

a right rear camera coupled to said backhoe proximate a right rear corner of said roof, said right rear camera being operationally coupled to said monitor for displaying images from said right rear camera, said right rear camera being pivotally adjustable relative to said backhoe to monitor an area adjacent to said backhoe between a rear of said backhoe and a right side of said backhoe, said left rear camera and said right rear camera each including a zoom lens adjustable to provide a close up view within said areas adjacent to said backhoe;

a remote control unit;

a front arm control positioned on said remote control unit, said front arm control being operationally coupled to said front arm for maneuvering said front arm;

a front bucket control positioned on said remote control unit, said front bucket control being operationally coupled to said front bucket for maneuvering said front bucket;

a rear boom arm control positioned on said remote control unit, said rear boom arm control being operationally coupled to said rear boom arm for maneuvering said rear boom arm;

a rear bucket control positioned on said remote control unit, said rear bucket control being operationally coupled to said rear bucket for maneuvering said rear bucket;

a monitor pivotally coupled to said remote control unit, said monitor being operationally coupled to said left front camera and said right front camera for displaying images from said left front camera and said right front camera;

a left front camera control positioned on said remote control unit, said left front camera control being operationally coupled to said left front camera for operating and adjusting said left front camera;

a right front camera control positioned on said remote control unit, said right front camera control being operationally coupled to said right front camera for adjusting said right front camera;

a left rear camera control positioned on said remote control unit, said left rear camera control being operationally coupled to said left rear camera for operating and adjusting said left rear camera;

a right rear camera control positioned on said remote control unit, said right rear camera control being operationally coupled to said right rear camera for adjusting said right rear camera;

a pair of neck slots in said remote control unit, said neck slots being positioned proximate a top of said remote control unit;

a neck strap having opposite ends, each end of said neck strap being coupled to an associated one of said neck slots;

a waist slot in said remote control unit, said waist slot being positioned proximate a bottom of said remote control unit;

a waist strap coupled to said waist slot of said remote control unit;

a drive control positioned on said remote control unit, said drive control being operationally coupled to said drive system of said backhoe for moving said backhoe;

a steering control positioned on said remote control unit, said steering control being operationally coupled to said steering system of said backhoe for steering movement of said backhoe;

a plurality of protective housings, each protective housing being coupled to an associated one of said left front camera, said right front camera, said left rear camera, and said right rear camera;

a right stabilizer control positioned on said remote control unit, said right stabilizer control being operationally coupled to said right stabilizer arm for adjusting said right stabilizer arm;

a left stabilizer control positioned on said remote control unit, said left stabilizer control being operationally coupled to said left stabilizer arm for adjusting said left stabilizer arm;

an engine control positioned on said remote control unit, said engine control being operationally coupled to said engine for adjusting rpms of said engine during use of said backhoe; and a gearshift control positioned on said remote control unit, said gearshift control being operationally coupled to said gears of said drive system.

* * * * *